(12) United States Patent
Friesel

(10) Patent No.: US 9,081,092 B1
(45) Date of Patent: Jul. 14, 2015

(54) COVARIANCE ROTATION WITH PERSPECTIVE PROJECTION FOR CREATING RADAR SEARCH VOLUMES FROM REMOTE CUES

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 893 days.

(21) Appl. No.: 13/197,572

(22) Filed: Aug. 3, 2011

(51) Int. Cl.
*G01S 13/00* (2006.01)
*G01S 13/72* (2006.01)
*G01S 13/66* (2006.01)

(52) U.S. Cl.
CPC .............. *G01S 13/726* (2013.01); *G01S 13/66* (2013.01)

(58) Field of Classification Search
CPC ....... G01S 13/70; G01S 13/726; G01S 17/66; G01S 13/66
USPC .......................................................... 342/95
See application file for complete search history.

(56) References Cited

U.S. PATENT DOCUMENTS

| | | | |
|---|---|---|---|
| 4,467,447 A | 8/1984 | Takahashi et al. | |
| 5,103,233 A * | 4/1992 | Gallagher et al. | 342/408 |
| 5,890,012 A | 3/1999 | Poisner | |
| 7,184,036 B2 | 2/2007 | Dimsdale et al. | |
| 7,221,307 B1 | 5/2007 | Friesel | |
| 2006/0202886 A1 | 9/2006 | Mahapatra et al. | |
| 2007/0018882 A1 | 1/2007 | Manoogian et al. | |
| 2008/0153414 A1 | 6/2008 | Ho et al. | |
| 2008/0210016 A1 | 9/2008 | Zwirn et al. | |

OTHER PUBLICATIONS

Eberly, D., "Perspective Projection of an Ellipsoid", Geometric Tools, LLC., http://www.geometrictools.com, Created Mar. 2, 1999, last Modified Mar. 1, 2008.

* cited by examiner

*Primary Examiner* — Frank J McGue
(74) *Attorney, Agent, or Firm* — Howard IP Law Group, PC

(57) ABSTRACT

A radar installation searches a limited volume within view, such as a covariance ellipsoid where a target is expected to be found based on a cue from a remote radar. The radar activates beams selected from an angularly diverging array of beams spanning the azimuth and elevation of an acquisition face whose area increases with range from the radar. A controller projects the search volume relative to the acquisition face, for selecting beam positions intersecting the search volume, and activates beams for a time interval that determines maximum range. A coordinate transformation is effected, so that with decreasing range, the angular divergence between projected points of the search volume is correspondingly increased, including points tangent to outer edges of the ellipsoid. The search volume accurately corresponds to the covariance ellipsoid by accounting for perspective in this way, reducing the time needed to examine the search volume for the target.

16 Claims, 5 Drawing Sheets

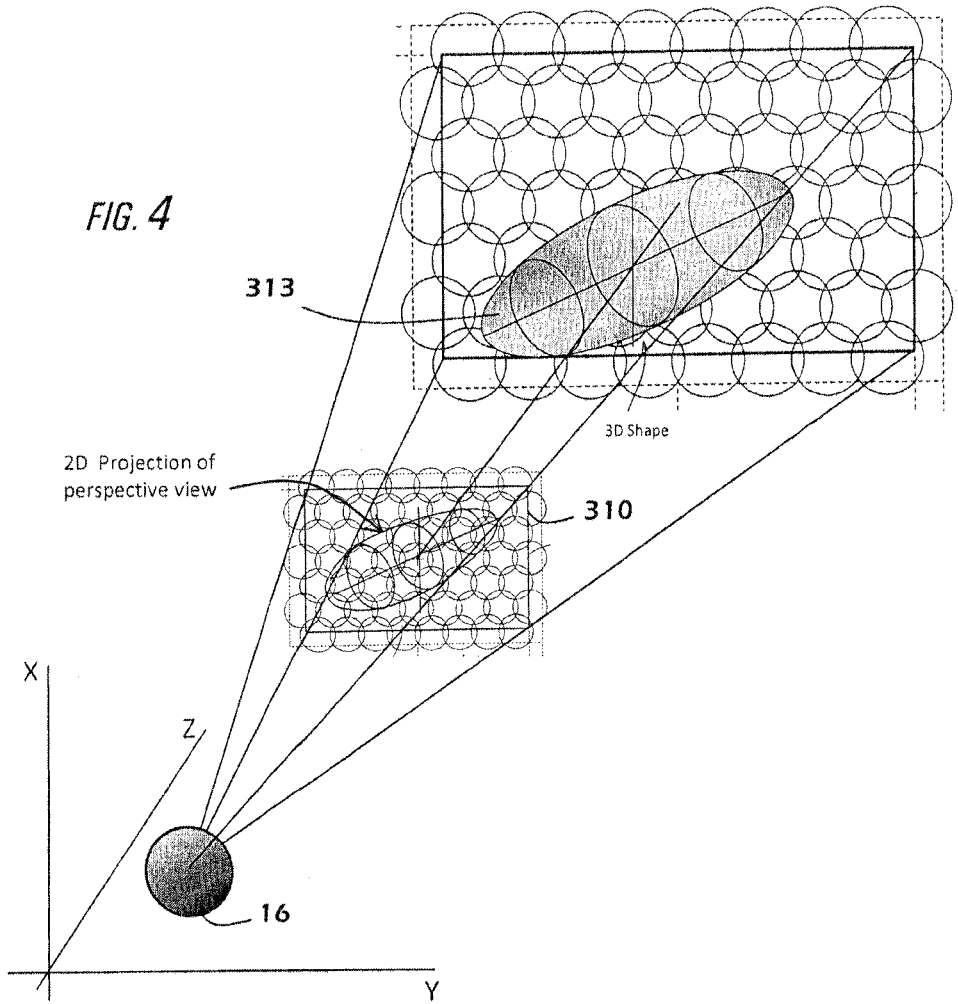

COVARIANCE ROTATION WITH PERSPECTIVE PROJECTION FOR CREATING RADAR SEARCH VOLUMES FROM REMOTE CUES

FIELD OF THE INVENTION

The invention relates to a system and method for planning and executing fast and efficient searches of acquisition volumes for radar systems, especially for beam forming radars.

A limited acquisition volume within the full searchable volume of the radar system is identified mathematically by a processor, especially from cueing information. The acquisition volume can be a covariance ellipsoid derived from one or more earlier local or remote acquisitions of a target whose present location is being sought. A search is matched to the span of azimuth, elevation and preferably also range encompassing the acquisition volume. A rotated projection of the covariance ellipsoid is adjusted to account for perspective due to the radiating configuration of the radar beams.

BACKGROUND

The bounds of a volume to be searched by a radar system seeking to acquire a target can be limited if a cue is available as to the likely location of the target within a larger searchable volume at the time of the search. A volume likely to contain the target, termed a covariance volume, can be determined from the cue. The cue can derive from the coordinates of the target in space at a previous time when the target was acquired, possibly further taking into account an observed velocity vector and other knowledge of the target. The probability of the target being at one location or another within the volume could be variable, but for simplicity, it may be assumed that the covariance volume is simply a volume defined by shape and size, in which the target is likely to reside with a predetermined threshold of probability. It is desirable to locate the target dependably and quickly, and/or to update the target location frequently. Therefore, it is desirable accurately to limit the search to an acquisition volume that encompasses all locations within the covariance volume and wastes no time on locations that are outside of the covariance volume.

The cue may be provided in part from signals from a remote radar that acquired the target at one or more earlier times. There are several measures of uncertainty such as the correspondence of the location coordinate systems of the local and remote radars, the tolerance in the remote radar's measurements, displacement due to changes in direction or speed, etc. Given these uncertainties and optionally also accounting for assumptions about the nature of the target, an estimated present position can be inferred, surrounded by a span of spatial uncertainty, thereby defining a covariance volume in space according to the coordinate system employed by the local radar system that is searching for the target. In one arrangement, the covariance volume can be defined by the location, dimensions and orientation of an ellipsoid. This is the volume to be searched, where the target is expected to be found. The search volume, namely the acquisition volume, is limited to or at least concentrated on the covariance volume.

The radar emits at least one pencil beam and at successive time periods aims the beam at angularly displaced positions. The lines of the angularly displaced beams diverge or radiate from the radar system; and the beam width widens proceeding away from the radar system. Preferably in a repeating cycle, the radar aims at each beam position for a sufficient dwell time to account for a time delay in which a signal emitted from the radar can impinge on a target at a maximum range, be reflected, and for the echo to be received at the radar. A given echo return time corresponds to a given range from the radar. From the succession of beam emissions and possible returning echoes after a predetermined time, one can define an acquisition face, although the beams are multiplexed in time divisions.

The beams have a beam width that is sufficiently large, and the beams are aimed at angles incrementally displaced by a small enough angle, so that the beams overlap and effectively encompass all the area of the acquisition face. The area of the acquisition face increases with increasing range from the radar due to the angular divergence of the beams and the radiation of the beam directions from an origin at the radar system. At any given range (namely a given distance from the radar), the arrayed beams have horizontal limits (namely a span of azimuth or laterally diverging angles) and vertical limits (a span of elevation or vertically diverging angles). The radar system is capable of searching the entire volume between the limits of azimuth and elevation and between minimum and maximum ranges that are determined from the geometry of the system and considerations of timing and minimum echo signal strength. But the control system of the radar advantageously limits the azimuth and elevation of the beam directions used, and optionally can adjust to less than full dwell time, so as to search specifically a predetermined covariance volume that is smaller than the maximum volume of which the system is capable of searching, when seeking or tracking a target.

The distances between a selected maximum and minimum range and the angles between selected limits of azimuth and elevation define an acquisition volume. If the ranges and angular spans are equal, the search volume is shaped as a truncated spherical section. However the covariance volume typically is not a truncated spherical section, and instead may be, for example, a covariance ellipsoid volume that is located, dimensioned and oriented based on the target location cue. What is needed are ways to adjust the extents of the search volume, between angular limits of azimuth and elevation, and between minimum and maximum limits of range, to confine the search as near as possible to the covariance volume, e.g., a covariance ellipsoid.

For cued target acquisition by a local radar system, the volume of uncertainty (e.g., the covariance ellipsoid) may be derived from results of an earlier acquisition of the target. The earlier acquisition may have been by the same local radar system or by a remote radar system in communication with the subject local radar system. The time of acquisition, the spatial coordinates and possibly a velocity vector (or similar pertinent elements of information) are reported from the remote radar system or otherwise known at the local radar system. Direction and speed may remain the same or may change due to active guidance or the influence of gravity. Changes are expected to be within practical limits. From reported information and a span of uncertainty, the covariance volume is inferred. With increasing time after an earlier acquisition, uncertainties in direction and speed multiply and the covariance ellipsoid enlarges. Using inferences from previous observation, probability factors and assumptions, the covariance ellipsoid is constructed logically. It is possible to mathematically define a covariance space in various ways, such as a sphere or cube or other shape. In the present examples, the covariance volume preferably is defined as an ellipsoid of predetermined size, shape, eccentricity and orientation in space.

In order to search the volume of the covariance ellipsoid, the outermost active beams in azimuth and elevation should encounter the extreme outer edges of the covariance ellipsoid. The inner beams should paint the entire projection of the covariance ellipsoid as viewed from the radar. Time devoted to beams in the pattern that do not intersect the covariance volume is wasted. Areas within the covariance volume that are not searched by an incident beam present a risk that the target located there may escape detection.

Mathematical methods have been proposed to project a covariance ellipses onto perpendicular planes that intersect the centers of azimuth and elevation of a radar system. The beams at the extremes of azimuth and elevation are tangents to the covariance ellipse in their respective plane and those beams can define the outer limits of the span of azimuth and elevation to be searched. The controller bypasses beams that are not oriented to intersect the projection of the covariance volume. What is needed is accurately to determine the outer extents of azimuth and elevation that correspond to the outer edges of the covariance volume from the viewpoint of the radar system, and preferably also to determine the maximum and minimum range of each beam.

U.S. patent application Ser. No. 12/879,374, entitled "Method for Scanning a Radar Search Volume and Correcting For 3D Orientation of Covariance Ellipsoid," Mark Friesel, teaches use of a parallel projection. The full disclosure of said application is hereby incorporated by reference herein. The parallel projection technique is reasonably accurate but may cause the acquisition face to be offset from an ideal position, because a parallel projection employs a projection of the covariance ellipsoid at a nominal range, i.e., a projected outline of the ellipsoid on a surface parallel to the surface of the radar acquisition face. The outer limits of azimuth and elevation (the extents) are determined based on the edges of the projection at a nominal range of the covariance ellipsoid, projected onto azimuth and elevation planes intersecting the centers of the radar and of the covariance ellipsoid.

The radar acquisition face is effectively a shadow view, i.e., a silhouette in two dimensions, with a nominal azimuth center and elevation center, and azimuth and elevation extents on either side of center, and minimum and maximum ranges. A two dimensional projection of a covariance ellipsoid encompasses an ellipsoid of arbitrary orientation. However, parallel projection methods for determining search volumes produce less than ideal descriptors for the search volume. This occurs because the volume of the covariance ellipsoid as viewed from the radar system is affected by perspective. Elements of a shape that have a given size but are at a greater range from the observer have a smaller apparent size than elements of equal size at a nearer distance, which have a relatively larger apparent size. At the same time, the increasing area of the acquisition face with increasing range is such that any given beam encompasses a larger area at greater range than the same beam encompassed as shorter range.

What is needed is an efficient technique for defining descriptors for a search volume accurately, i.e., limits or extents of elevation, azimuth, and preferably range, and with a minimum of complication.

SUMMARY

It is advantageous for the calculated size of the search volume to correspond closely with the volume of the covariance ellipsoid. An aspect of the present disclosure is that inaccuracies in the defined search volume resulting from use of a parallel projection are corrected by taking into account differences in apparent size with differences in range. This may be regarded in part as a technique for taking into account perspective when projecting the apparent edges of the covariance ellipsoid. In perspective view, an object that extends over a span of range has a relatively larger scale (and apparent size) where closer to a viewer, versus a smaller scale at a greater distance.

Due to divergence of the beams from a radar, an object of a given size produces a silhouette at a near distance that occupies a relatively larger proportion of the acquisition face than occupied by the same object at a longer range. In perspective viewing, the apparent size of an object at a near distance is larger than the apparent same object when at a greater distance. It is an aspect of this disclosure to take into account and to correct for variations in range, when projecting points on the surface of a covariance ellipse onto the radar acquisition face.

The apparent maximum/minimum elevation and the lateral extremes of azimuth extents of the covariance ellipsoid, as viewed as a shadow on the acquisition face, may occur at less-than or greater-than a nominal range. The rear surface of the covariance volume is on the far side of the covariance volume, at a greater range than the near side from the radar, and is relatively smaller on the acquisition face. An aspect of the present disclosure is to use the three dimensional shape of the covariance volume, and a correction for viewing three dimensional shapes in perspective, as well as taking into account the spherical nature of a radar beam array, to improve the accuracy with which the radar search volume is caused to correspond to the covariance volume.

The disclosed method improves the accuracy of the extents and center defining the acquisition face compared to the results of the rotated covariance method described in application Ser. No. 12/879,374. Accuracy is improved by applying a perspective projection to define the extents of the covariance or other uncertainty volume when projected onto the acquisition face, namely the viewplane of the radar beam array.

A parallel projection does not account for the distance from the observer (the range) of points on the surface of the covariance volume (e.g., ellipsoid), but assumes that these are in a flat surface at or within a nominal distance of the center of the uncertainty region accompanying the cue. By application of a perspective correction, the projection used to develop the acquisition face is displaced to account for the relatively larger apparent scale nearer to the radar and relatively smaller scale at a longer range. The correction can be accomplished by a mathematical matrix translation respectively decreasing the scale of the scale of the uncertainty volume with increasing range and enlarging the scale of the volume with decreasing range, from the nominal range at which a parallel projection would otherwise be defined. Having made the correction, the beam positions that intersect the outer edges of the covariance volume are determined, and a search pattern is planned that accurately encompasses all the points of the covariance volume.

The disclosed system and method improve upon methods for search volume generation from a remote cue. The perspective adjusted method eliminates wasted radar resources enabling accurate matching of the radar beams to the edges of the search volume. Perspective projection in place of parallel projection provide both more accurate extents estimates and the elimination of an undesired offset of the search volume center caused by a range effect.

These and other objects and aspects are provided according to the present disclosure in a method for locating a radar search target that includes providing a radar installation with an array of adjacent beam positions diverging angularly from a radar transceiver coupled to a controller. The controller selectively activates transmitted beams and the radar monitors for reflected beams from the target, at least for a subset of the beam positions available between limits of azimuth and elevation defining the acquisition face. The acquisition face is one of a plane and a spherical surface, generally normal to a centerline of view of the radar installation, which might be fixed or also capable of being aimed, e.g., rotated around a vertical and/or horizontal axis. The acquisition face has an area that increases with range proceeding away from the radar installation. On the other hand, three dimensional bodies that might be defined within the searchable volume are subject to perspective, meaning that the apparent size of shapes that are closer to the radar is greater than the apparent size of the same shape if located farther away. The controller chooses the beams to activate and monitor for reflections from the target, for a time interval that defines a near and far range for the beams, between minimum and maximum limits of range. An object is to cause the beams and their monitored times to correspond accurately with a limited search volume where the target is expected to be found, such as a volume that is derived logically from a previous acquisition or from a cue obtained by signals received from a remote radar.

At least one search volume is identified, and examined with the intent of locating at least one target by receiving an echo. The target is localized as residing along a bearing line (an azimuth and an elevation) of at least one beam, and at a range defined by the illuminating beam transmission and echo return transmission times. Multiple volumes and targets can be managed concurrently. The search volume might or might not be defined by a regular geometric shape; however to simply the explanation, the example of a covariance ellipsoid is used as an example. The ellipsoid has a size and orientation derived logically, e.g., from the cue of from other knowledge of the target. The controller or another processor associated with the controller projects the search volume onto the acquisition face. The controller activates those beam positions that correspond on the acquisition face to projected portions of the search volume and maintains a sufficient dwell time to account for a maximum range on a far side of the search volume. Beam positions that do not intersect the projected search volume are not activated, providing additional time or a faster repetition rate for positions that do intersect the search volume.

According to one aspect of the disclosure, projecting the search volume onto the acquisition face includes correcting the projection to ensure that differences of perspective are included, i.e., portions of the search volume that are located closer to the radar installation need to appear larger as projected onto the acquisition face than portions of the search volume that may be of equal size but are located farther away from the radar installation and thus should encompass a smaller angular extent of the acquisition face. This effect is corrected by adjusting the angular extent of projected parts of the search volume as a function of range. A specific method for effecting the correction is discussed in detail below.

In examples disclosed in detail herein, the search volume is defined in part by the coordinates of points. The search volume is a three dimensional geometric shape in a coordinate system. Correcting for the differences of perspective when projecting the search volume onto the acquisition face can comprise applying a matrix conversion to the coordinate positions of the points. In a disclosed embodiment, lines are projected from the center point of the beam array at the radar, through the coordinate positions of two or more points on the perimeter of the search volume, including points at tangents to a covariance ellipsoid. These lines intersect a given azimuth and elevation and define angular differences between one another or between the line and a reference line such as a line from the center of the radar through the center of the acquisition face. Where the search volume or parts thereof are closer, the angular difference is increased accordingly, and where the range is farther, the angular difference is decreased, thereby accounting for perspective.

Advantageously, the search volume is defined by a covariance ellipsoid identifying the volume in which the search target is expected to be located. The size and orientation of the ellipsoid can be based on a cue comprising at least one of a previous location, a previous velocity vector, and an expected target category or other information. For example if the target is a powered aircraft, unchanged continued velocity after a previous target acquisition can be plotted to an expected location. Changes in speed or heading may have occurred, whereby the new location may differ within practical limits from the location suggested by unchanged velocity, etc. In any event, a volume encompassing possible locations may be inferred based on starting conditions (location, heading, velocity), probabilities and practical limits, possible knowledge of the nature and capabilities of the target, and a threshold probability. A volume is computed or entered, defining a regular or irregular shape of a predetermined size and orientation.

In one embodiment, correcting for differences of perspective comprises calculating a differential angle between points of the search volume, and relatively increasing and decreasing the differential angle between points as a function of a range that is nearer and farther from the radar installation, respectively. At least one of the points to be used can be an outer edge of the search volume, and by modifying the differential angle as a function of range, the edge of a projected shape such as an ellipse can be more accurately projected to be the outline or silhouette of the apparent shape as seen from the perspective of the radar. One of the points on the outer edge can be a tangent point on a covariance ellipse.

According to one embodiment, azimuth and elevation lines to tangents or other selected points are considered to define differential angles with lines to other points. Using a geometric conversion intended to produce a projection of the apparent size of the search volume on the acquisition face, the differential angles are corrected for said differences in perspective. Generally, the nearer shapes are enlarged in apparent area and the farther shapes are diminished in apparent area. After correction, the beam positions in the acquisition face that correspond to the search volume as corrected are successively activated. The controller can repetitively cycle through these beam positions in a time division multiplexed manner. Likewise, the controller can cycle through the beam positions in a manner using unequal time divisions, for example using longer time divisions with respect to a portion of the target volume at longer range and shorter time divisions for portions at closer range, thereby efficiently devoting the available time and beam area to the search volume.

More particularly, in one embodiment, correcting for differences of perspective includes calculating and projecting a three dimensional (3D) covariance ellipsoid onto a range-traverse plane and onto a range-elevation plane to thereby produce two mutually perpendicular two dimensional (2D) ellipses. The ellipses on each of said range-traverse and range-elevation planes are then adjusted for perspective. The maximum angular extents in said two ellipses are determined in each of the range-transverse and range-elevation planes. For example, the angular difference is determined between the tangents at the margins of the projected ellipses. The range at which the tangents occur is also determined. The subtended angles between the tangents or margins is then increased with decreasing range and decreased with increasing range, accounting for differences of perspective.

The increased and decreased subtended angles are deemed to be the angles representing the total extents or span in the azimuth (transverse) and elevation directions. The radar is controlled to search within limits of angular extent corresponding to the increased and decreased subtended angles. In a further embodiment, the angular extents of points on the ellipses on the far side of the covariance ellipsoid can be adjusted for range in like manner. The far-side points are at the extreme range of the search area corresponding to the covariance ellipsoid and determine the minimum necessary dwell time for the beams. Limiting the dwell times of the beams to the time necessary to search accurately out to the range of the far side of the covariance ellipse conserves time.

According to these and other aspect of the disclosure, a radar installation searches a limited volume within view, such as a covariance ellipsoid where a target is expected to be found based on a cue from a remote radar. The radar activates beams selected from an angularly diverging array of beams spanning the azimuth and elevation of an acquisition face whose area increases with range from the radar. A controller projects the search volume relative to the acquisition face, for selecting beam positions intersecting the search volume, and activates beams for a time interval that determines maximum range. A coordinate transformation is effected, so that with decreasing range, the angular divergence between projected points of the search volume is correspondingly increased, including points tangent to outer edges of the ellipsoid. The search volume accurately corresponds to the covariance ellipsoid by accounting for perspective in this way, reducing the time needed to examine the search volume for the target.

BRIEF DESCRIPTION OF THE DRAWINGS

The details of the invention, both as to its structure and operation, may be obtained by a review of the accompanying drawings, in which like reference numerals refer to like parts, and in which:

FIG. 4 is a schematic representation showing a covariance ellipse of arbitrary size and orientation within the search volume, the ellipse being projected onto the nearer acquisition face with a correction for perspective; and, FIG. 5 is a flowchart illustrating steps according to an exemplary embodiment of the invention.

DETAILED DESCRIPTION

Figure 1:
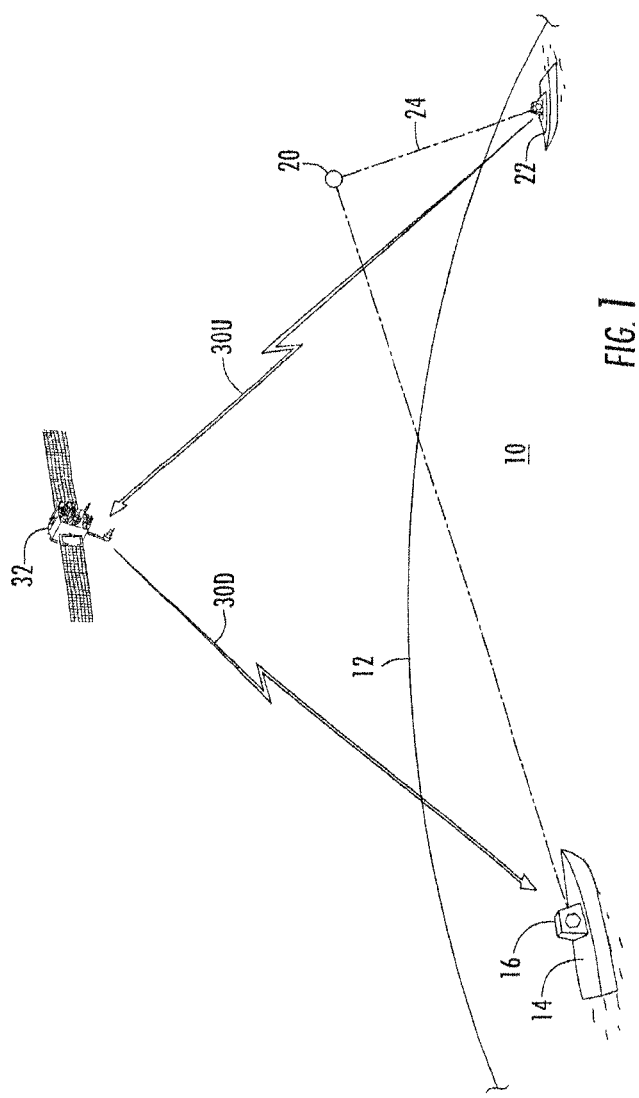
FIG. 1 is a figurative representation of a radar-equipped sea going vessel receiving a signal from a remote sensor (such as a remote ship with a radar), the signal containing a cue as to the location of an airborne target.

Radar systems such a naval radars can be configured to search a volume in space for a target, under control of a command and decision processor. The radar selectively directs a narrow beam from the radar along a beam direction, preferably as a short pulse, and monitors for receipt of a returning echo over a dwell time sufficient to receive back an echo, provided that a target on which the beam impinges is located along the beam direction and within a maximum range. The radar then advances to a next beam direction angle, emits a beam at that angle and monitors for a returning echo, and so forth. There are a variety of actively and passively scanned configurations possible for such radars, operable at single or multiple frequencies and using provisions such as phase variations and constructive/destructive interference to aim the beam.

Preferably, the radar cyclically emits and monitors along all the beam directions necessary to encompass a search volume and then repeats the process. The search volume could be the total volume of which the radar is capable of searching, but advantageously the radar can be enabled to search a particular span of azimuth and elevation angles and optionally also to adjust the dwell time at each angle, so as to search a volume that is smaller than the total and has an arbitrary size, shape and orientation. By limiting the search to a relatively smaller volume when possible, searches can be accomplished more quickly and repeated at a higher repetition rate.

The successive emitted beams can be adjacent in the sense of having incrementally different angles of azimuth and elevation, each beam having an effective beam width that slightly overlaps the beam width of the next adjacent beams. The beam direction(s) that produce an echo identify the direction of the target(s). The signal propagation time between emitting the signal and receiving the reflection identifies the range or distance from the radar to the target. The range or distance is determined, given a known signal propagation speed, from the time taken for the signal to propagate from the radar to the target and for the echo to propagate back to a receiver disposed at or associated with the radar.

A command and decision element such as a programmed processor can be used to select the volume to be searched, including selecting a subset of beam directions that define an acquisition face encompassing a projection of the volume to be searched. This may be one of various selectable modes of operation. An other mode may be to direct the radar beam successively to each possible angle of which the radar is capable, so as to cover the entire possible search volume, or to sample two or more different search volumes of interest, etc. It is advantageous when frequent updates are desirable and a target is known with some degree of confidence to be within a certain angular sector, to repetitively search the beam directions in that angular sector, in a volume search mode.

When information becomes available about the possible presence of a target at or near a location that can be computed by reference to a coordinate system to be in a given angular direction and potentially also a given range relative to the radar, it may be desirable to examine a volume encompassing that location in an effort to acquire the target. Where the information is derived from a report of a target position from another source such as a cooperating radar at another location the techniques is known as a "cued" search. In one scenario, the information might be accurate, recent and detailed, dictating a relatively small search area. In a different scenario, the information might be of a lower level of accuracy and delayed or incomplete, in which case a larger area search might be needed to acquire the target. When the volume to be searched is large, a relatively long time may be needed to search the volume. If the volume selected to search is too small, a search of the volume may not reveal the relevant target(s). Techniques are used to define a search volume logically that has an optimal probability of acquiring the target.

The search volume can be defined as geometric shape with a given location, size and orientation.

U.S. patent application Ser. No. 12/208,588, incorporated by reference herein, generally describes a method for searching a region with an angular span of azimuth and elevation about a given cued direction and with a given maximum search range, thereby defining a search volume. The search of the designated volume is performed by sequentially generating adjacent radar beams having defined beam widths by which adjacent beams overlap slightly. The method comprises acquiring the nominal target track position and velocity (cue information) as of a given time, and applying error information describing the uncertainty in the cue information. This error information may be presented together with the cue information. From the error information, the azimuth and elevation extents (the acquisition or search face) of the search volume about the cue direction are determined.

FIG. 1 illustrates an exemplary situation 10 as described. A line 12 defines the horizon. A ship 14 (which can be deemed our "own" ship) carries a radar system 16, portions of which are illustrated as a block on the deck of the ship 14 and also shown in block diagram in FIG. 2. The radar system 16 comprises a signal source and a receiver forming a radar transceiver, and a controller such as a computer processor for configured to aim the radar transceiver along narrow beam directions. In the scenario of FIG. 1, a target 20 is located at a distance from ship 14, but is along a line-of-sight such that the target 20 may be detected by radar system 16 if a beam from the radar is aimed to intersect the location of target 20. Target 20 is also along a line of sight 24 from a ship 22 (an "other" ship) remote from our own ship 14. The other ship 22 obtains information about the location of target 20 and conveys information to our own ship 14, for example by signaling via uplink 30U to satellite 32 and downlink 30D to our own ship 14. Our own ship 14 (and possibly other ships and assets associated with ship 22) may not be aware of the presence of target 20, or if aware may not have a definite knowledge of the heading to the target 20 and the range to the target. The other ship 22 transmits coordinates of the target 20, such as a position at a given point in time, to other assets in particular including to our own ship 14. Additional information may be available aboard other ship 22 to report the nature of the target, a velocity vector, a measure of the perceived quality of the information, information for assessing an error or tolerance of the reported target coordinates and other pertinent information as well as the coordinates at a given time.

Figure 2:
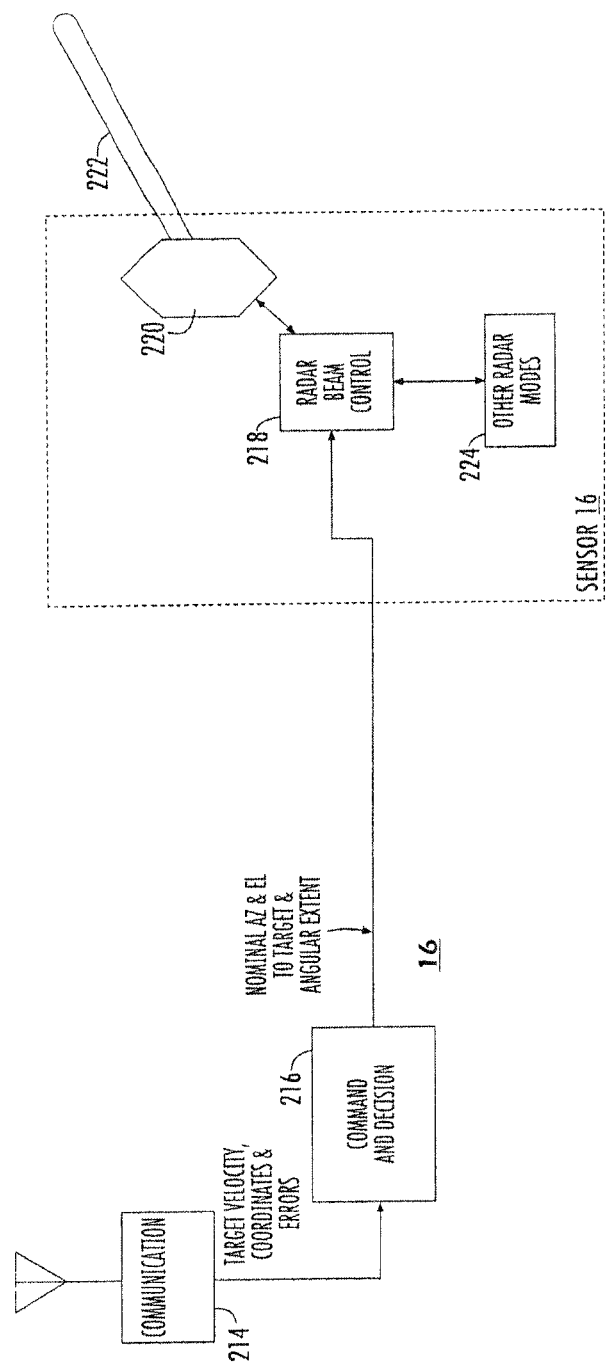
FIG. 2 is a simplified block diagram illustrating subassemblies and functions relating to communications and control for acquisition of the target in a situation as shown in FIG. 1.

Referring to FIG. 2, own ship 14 includes a receiver 214 with a communication antenna for communication with other assets, capable of receiving communications represented in FIG. 1 by path 30D. The communications include information relating to the location of target 20 and any information regarding errors or probabilities associated with the location. This information may include, for example, a target velocity, coordinates and a measurement error substantially contemporaneous with a time the information is communicated. The information is provided to a command and decision functional element 216, which processes the target location information from ship 22 of FIG. 1. From this location information, command and decision element 216 determines a target azimuth and elevation angle relative to own ship 14 for a sensing radar system 16 on own ship 14 to acquire target 20. The azimuth and elevation contain a degree of error, and accordingly, the radar system 16 at our own ship 14 examines a search volume around the expected location of target 20 until the target is acquired. Thus, a search acquisition face encompassing a group of beam directions is searched by the location sensing radar system 16 of own ship 14 to acquire the target at its present location. Insofar as the search volume encompasses a span of distances from own ship 14 that difference from one beam to another, the dwell times along the beam directions also can be adjusted, or alternatively, all the beams can be monitored out to the maximum distance (or "range").

The expected target azimuth and elevation relative to own ship 14 of FIG. 2, and a measure of the azimuth and elevation extents (or spans of angular differences) required to encompass the expected target location and also an adjacent area to account for errors in target azimuth and elevation, are transmitted from Command and Decision block 216 of FIG. 2 to an own ship radar beam control 218, which may be part of the command and decision computer or may be a function of a separate computer. Radar beam control 218 coordinates the direction of one or both of transmit beams and receive beams by a radar antenna array face 220. The transmit and receive beams are "pencil" or highly directional narrow beams, such as provided by multiple-antenna phased arrays as known in the art. A representative pencil beam is illustrated as 222. Radar beam control 218 may also receive commands from other functional modes, such as wide-area search modes, illustrated together as a block 224.

Figure 3A:
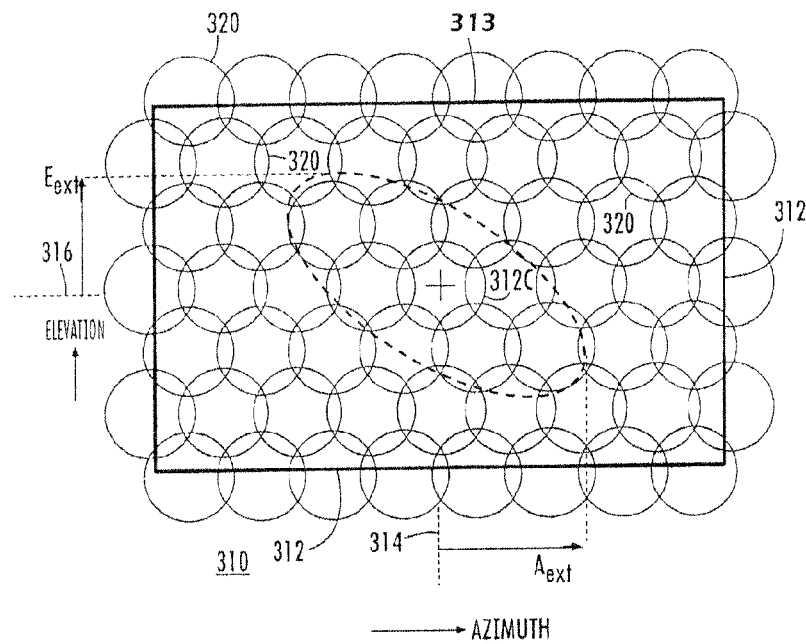
FIG. 3A is an exemplary depiction of an acquisition face with an array of adjacent beam positions.
Figure 3B:
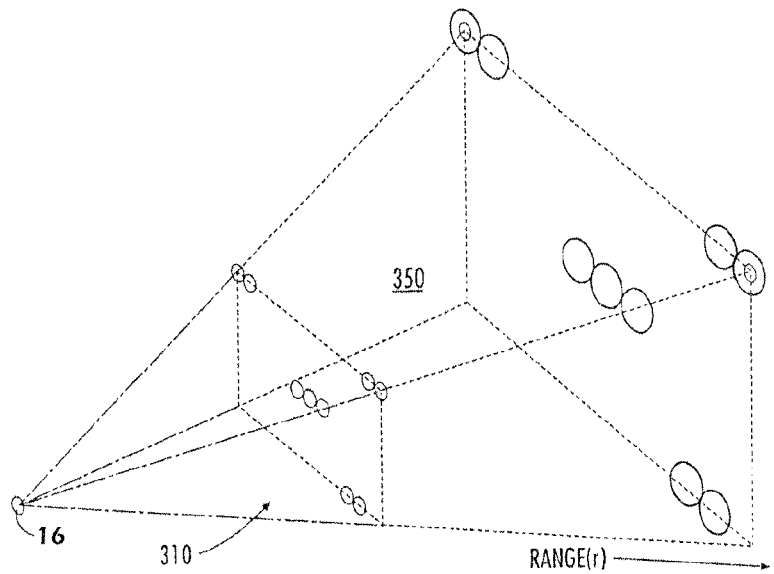
FIG. 3B is a representation of the relationship between an exemplary acquisition face determined by angularly adjacent beams and the associated search volume resulting from the beams being configured to detect targets over a predetermined range.

The radar beam controller 218 of FIG. 2 via the antenna face 220, sequentially produces a pencil beam at each of an array of angularly spaced directions, and monitors for reception of an echo reflected by a target along the pencil beam, then moves to a next direction in the array. In conjunction with one another and over a span of time needed to transmit and receive over the complete array of pencil beams in an acquisition face (monitoring at each angular direction over the time needed to obtain a possible echo from a target located between minimum and maximum range), the pencil beams search a volume of space for the target. An elevation view of an acquisition face is shown in FIG. 3A. The search volume is defined by the area of the acquisition face times the span of desired range. Due to the angularly spaced diverging nature of the pencil beams and the divergence of the beams themselves, the area of the acquisition face expands proceeding away from the radar, which is illustrated in FIG. 3B. In this figure, the acquisition face is modeled as a flat plane and the search volume 350 is shown as a truncated pyramid between the smaller and larger states of the acquisition face as shown. It should be appreciated that the acquisition face can be modeled as a spherical surface with the search volume 350 considered a segment of a spherical arc.

In FIG. 3A, the search or acquisition face 310, is a cross section through the pencil beams 312 in a plane normal to a center line or central beam 312C, where the individual beams are activated one at a time in a sequential beam generation sequence by the radar system 16 of FIG. 2. In FIG. 3A, the azimuth and elevation directions are indicated by arrows. The nominal target azimuth and elevation, as specified by the target azimuth and elevation angle relative to own ship 14 generated by block 216, appears as a + symbol at the center of the acquisition face 310, namely in the center of the central beam 312C. The span of elevation and the span of azimuth encompass a distance or "extent" on either side of the center. This span is sufficient to encompass a search volume 313, shown in phantom lines. Moreover, in the embodiment shown in FIG. 3A, only the central beams need to be activated in order to encompass the search volume 313.

A "cross-section" of each pencil beam is illustrated here as a circle, a representative set of beams 320 is represented and shown as overlapping one another to paint the full acquisition surface. In a practical embodiment, the transmit and receive pencil beams have a power distribution outwardly from their centers and are arranged at a density causing the beams to overlap their adjacent neighboring beams at a given power level. The magnitude of the signal depends upon the width and associated power distribution of the beams, and the relative density of the beam centers. The array of overlapping beams 320 is configured to provide effectively sufficient power distribution within their cross-sections shown by circles, to provide substantially full coverage of a region defined by a rectangular outline 312, out to the maximum range of the radar. That is, out to the maximum range, a beam incident on a target of minimum reflectivity produces an echo of sufficient amplitude to be detected at the radar system 16.

Assuming that the cued covariance ellipse (shown here as broken-line oval 313) occupies a limited area at the center of the array of beams, the azimuth "extent" or span of the coverage region needed to encompass the ellipse 313 is defined by the arrow designated $A_{ext}$, extending in both horizontal directions from a vertical centerline 314 to the edge of the ellipse 313. The elevation "extent" of the coverage region is defined by the arrow designated Eext, extending in the elevation or vertical direction from a horizontal centerline 316 to the outline 312. The radar beam control may select a different outline, a larger or smaller subset of available beam directions, a variably scanning subset of directions, etc.

Considering, for example, a covariance ellipsoid 313 that is centered on the range axis or vector (the marked center of beam 312C in FIG. 3A), the range axis is normal or orthogonal to the acquisition face 310 (the viewplane), which may be plane of the radar array antenna face 220 (FIG. 2). The azimuth axis and the elevation axis correspond to the width and height of the viewplane. The principal axes of the covariance ellipsoid 313 are at arbitrary orientations with respect to the viewplane axes and the range axis.

The three dimensional covariance ellipsoid is the region or volume of space having some designated or estimated probability of containing the target. As provided in application Ser. No. 12/879,374, the disclosure of which has been incorporated herein, a two-dimensional covariance ellipse is to be projected from the three-dimensional covariance ellipsoid onto the viewplane. The two dimensional silhouette 313 in FIG. 3A is intended to overlay the beam positions that intersect the covariance ellipsoid. To determine the search volume for the radar in terms of azimuth, elevation and range, it is necessary to know the extent of the covariance ellipsoid in azimuth, elevation, and range. According Ser. No. 12/879,374, the azimuth and elevation extents determined for the covariance ellipsoid are found by projection lines parallel with the range axis and tangent to the outer surface of the covariance ellipse. The projected locations of the tangent points determine angular extents $A_{ext}$ and $F_{ext}$ that are deemed to be equal on opposite sides of the center of the covariance ellipsoid because the projection of the covariance ellipsoid is centered on the center of the viewplane.

According to an aspect of the present disclosure, the parallel covariance ellipsoid projection method discussed in Ser. No. 12/879,374 is first obtained by convenient calculations, and then the accuracy of the three dimensional volume of the search is refined to account for perspective. Planning or configuring the search comprises selection of the beams in the azimuth and elevation extents that actually intersect the covariance ellipsoid, and selection of dwell times that cause the radar to search within the limits of range between the near and far sides of the covariance ellipse. The correction is accomplished by accounting for the aspect of perspective that distances between points on the covariance ellipse that are nearer to the radar (at shorter range) appear to be larger than distances between points on the covariance ellipse that are farther from the radar (at longer range) even though the distances are in fact equal.

According to an aspect of this disclosure, the refinements or corrections employed to refine the extents of azimuth, elevation and range can be accomplished by transforming the coordinate locations of points on the surface of the covariance ellipsoid from a parallel projection to a perspective projection. Given a covariance:

$$C = \begin{pmatrix} c_{11} & c_{12} & c_{13} \\ c_{21} & c_{22} & c_{23} \\ c_{31} & c_{32} & c_{33} \end{pmatrix}$$

a first step is to apply a rotation about the range vector to align the transverse and elevation axes of the projection with the transverse and elevation axes of the viewplane as described in Ser. No. 12/879,374, incorporated by reference above, but prior to projection onto the radar viewplane.

The rotation angle to align the principal axis of the projection of C onto the viewplane with the traverse axis of the viewplane is:

$$\eta = -\frac{1}{2}\sin^{-1}\left(\frac{2p_{12}}{\lambda_{p1} - \lambda_{p2}}\right)$$

where $p_{12}$ refers to the indicated element of the projection matrix and $\lambda_{p1}$ and $\lambda_{p2}$ are eigenvalues of the projection matrix.

Let B be obtained by rotating C through the above angle about the range vector. Then B is given by:

$$B = \begin{pmatrix} b_1 & b_4 & b_6 \\ b_4 & b_2 & b_5 \\ b_6 & b_5 & b_3 \end{pmatrix} =$$

$$R^T CR = \begin{pmatrix} 1 & 0 & 0 \\ 0 & \cos\eta & \sin\eta \\ 0 & -\sin\eta & \cos\eta \end{pmatrix}\begin{pmatrix} c_{11} & c_{12} & c_{13} \\ c_{21} & c_{22} & c_{23} \\ c_{31} & c_{32} & c_{33} \end{pmatrix}\begin{pmatrix} 1 & 0 & 0 \\ 0 & \cos\eta & -\sin\eta \\ 0 & \sin\eta & \cos\eta \end{pmatrix}$$

Handling the points in perspective is greatly simplified using the two dimensional projection, then solving for the tangents that also pass through the origin. The parallel projection onto the range-transverse plane yields the covariance:

$$B_{RT} = \begin{pmatrix} b_1 & b_4 \\ b_4 & b_2 \end{pmatrix}$$

The equivalent projection onto the range-elevation plane is $$B_{RE} = \begin{pmatrix} b_1 & b_6 \\ b_6 & b_3 \end{pmatrix}$$

Let the centroid of $B_{RT}$ lie at $(0, r_0)$, a point on they axis of a 2-D coordinate system centered at the position of the observer, and with they axis along the range vector. The nominal traverse and elevation angles may be incorporated in any result.

$$x_0 = \pm \frac{1}{r_0}\sqrt{b_1 r_0^2 - \|B_{RT}\|}$$

defines the x position of the points of tangency to the $B_{RT}$ ellipse, of tangent lines passing through the coordinate origin. The symbol $\|B_{RT}\|$ represents the determinant of matrix $B_{RT}$. The corresponding y coordinates of the tangent points are:

$$y_0 = r_0 + \frac{1}{b_1 r_0}\left[\pm b_4\sqrt{b_1 r_0^2 - \|B_{RT}\|} - \|B_{RT}\|\right]$$

The two transverse extents estimated by the above are:

$$\Delta T_\pm = \tan^{-1}\left[\frac{\pm\sqrt{c_1 r_0^2 - \|B_{RT}\|}}{r_0^2 + \frac{1}{c_1}\left[\pm c_4\sqrt{c_1 r_0^2 - \|B_{RT}\|} - \|B_{RT}\|\right]}\right]$$

The two elevation extents, found in a similar manner using $B_{RE}$, are $$\Delta E_\pm = \tan^{-1}\left[\frac{\pm\sqrt{c_1 r_0^2 - \|B_{RE}\|}}{r_0^2 + \frac{1}{c_1}\left[\pm c_6\sqrt{c_1 r_0^2 - \|B_{RE}\|} - \|B_{RE}\|\right]}\right]$$

The center $T_0$ of the region bounded by the traverse extents is found by adding the mean of the extents to $T_C$, the traverse component of the centroid of C, i.e. of the nominal state vector:

$$T_0 = T_C + \frac{1}{2}(\Delta T_+ + \Delta T_-)$$

The extent from this new center is:

$$T_{ext}(\Delta T_+ - \Delta T_-)/2$$

and is a single value. The elevation center and extent $E_0$ and $E_{ext}$ are found similarly. Using $T_0$, $E_0$, $T_{ext}$ and $E_{ext}$, the number of required search beams may be calculated. Along with $\eta$ these parameters are supplied to the search radar, where each search beam may be placed in its correct position.

Figure 5:
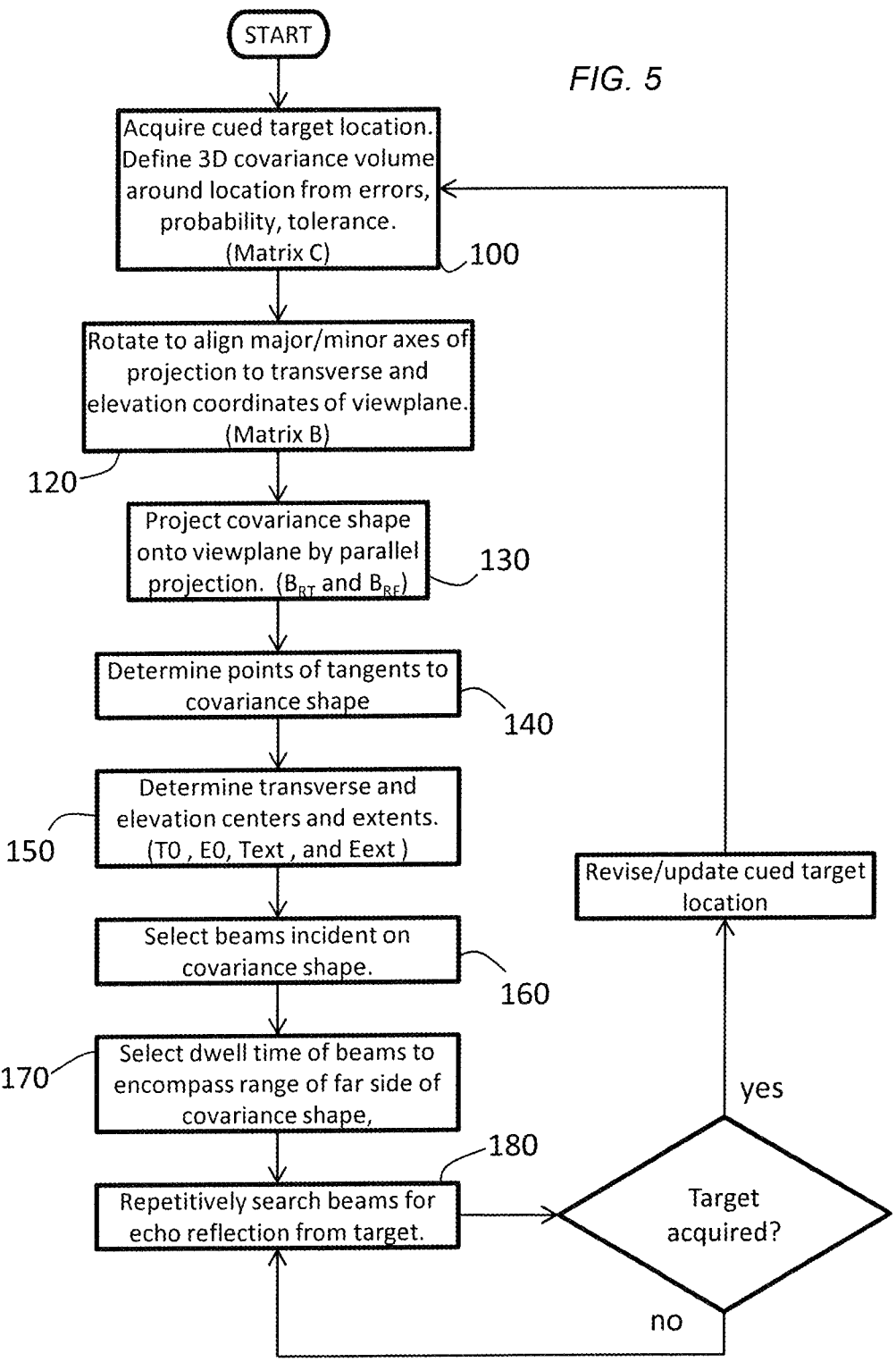

FIG. 5 is a flowchart showing the steps in an exemplary method for generating a cued search volume having improved accuracy as in the techniques described above. At step 100, state and error information (e.g., a definition of a covariance volume C) is obtained for a target. This definition may be obtained, for example, from a remote source or as a predicted likely location based on an earlier acquisition by the subject radar, by electronic communications or by other means.

At step 120, a rotation is applied to the covariance C about the range vector to align the transverse and elevation axes of the projection with the transverse and elevation axes of the viewplane orientation that will be used in this calculations employed to account for perspective corrections. The rotated covariance is designated B.

At step 130, the rotated covariance B is subject to parallel projection onto the range-transverse plane to obtain a projected covariance $B_{RT}$ and an equivalent projection of the rotated covariance B onto the range-elevation plane is obtained as projected covariance $B_{RE}$.

At step 140, x and y coordinates of the points of tangency to the $B_{RT}$ ellipse are determined, and x and y coordinates of the points of tangency to the $B_{RE}$ ellipse are determined. The transverse and elevation extents are derived from these two projections.

At step 150, the transverse center $T_0$ of a region bounded by the transverse extents is determined, and the transverse extent $T_{ext}$ from the center $T_0$ is determined. Likewise, the elevation center $E_0$ of a region bounded by the elevation extents is determined, and the elevation extent Eext from the center E0 is determined.

At step 160, the search beams required to search the acquisition face are identified using $T_0$, $E_0$, $T_{ext}$ and $E_{ext}$ and made available to the search radar controller. At step 170, the dwell times required for the search beams can be chosen to sense for the target up to the intersection of each beam with the far side of the surface of the covariance volume, or alternatively (and with some loss of efficiency as to time), the dwell times for all the beams can be set equally to encompass the range of the point on the covariance volume at maximum range.

The search radar controller can repetitively cycle (step 180) through a process of emitting a signal and detecting a reflection (if any) for each beam position. Assuming that the target is acquired, the target can be tracked or the original covariance volume definition can be updated such that the method as described can be repeated at a later time.

The disclosed method as described herein may be automated by, for example, tangibly embodying a program of instructions upon a computer readable storage media capable of being read by machine capable of executing the instructions. A general purpose computer is one example of such a machine. One or more processors may execute the instructions to perform part or all of the disclosed method. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes of FIGS. 1 through 5 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements. The functions and steps provided in FIG. 5 may be implemented in hardware, software or a combination of both and may reside on one or more processing devices located at any location of a network linking the respective elements or another linked network, including the Internet.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer implemented method for locating a radar search target, comprising:
   providing a radar installation with an array of adjacent beam positions diverging angularly from a radar transceiver coupled to a radar command and control processor, the radar command and control processor being operable for selectively activating transmitted beams and monitoring for reflected beams at least for a subset of the beam positions between limits of azimuth and elevation, the array of beam positions defining an acquisition face along one of a plane and a spherical surface, normal to a centerline of the radar installation and having an area increasing with range from the radar installation, wherein a time interval for activation of the beams defines a near and far range for the beams, between minimum and maximum limits of range;
   identifying using said radar command and control processor at least one search volume to be examined for a presence of at least one search target;
   projecting using the radar command and control processor the search volume onto the acquisition face and operating the controller for activating beam positions that correspond on the acquisition face to projected portions of the search volume;
   wherein said projecting of the search volume onto the acquisition face includes correcting using the radar command and control processor for differences of perspective caused by certain portions of the search volume being closer to the radar installation than other portions of the search volume.

2. The method of claim 1, wherein the search volume is defined by coordinate positions of points defining a three dimensional geometric shape in a coordinate system, and wherein said correcting for the differences of perspective for projecting the search volume onto the acquisition face comprises applying a matrix conversion to the coordinate positions of the points.

3. The method of claim 2, wherein the search volume is at least partly defined by a three dimensional numeric function in the coordinate system, and projecting the search volume onto the acquisition face comprises applying the matrix conversion to the numeric function defining the search volume.

4. The method of claim 1, wherein the search volume is defined by a covariance ellipsoid defining a volume in which the at least one search target is expected to be located, based on a cue comprising at least one of a previous location, a previous velocity vector, and an expected target category.

5. The method of claim 1, wherein the search volume is defined by a covariance ellipsoid defining a volume in which the at least one search target is expected to be located, based on a cue reported from a remote radar installation.

6. The method of claim 1, wherein said correcting for differences of perspective comprises calculating a differential angle between points of the search volume, and relatively increasing and decreasing the differential angle between points as a function of a range that is nearer and farther from the radar installation, respectively.

7. The method of claim 6, wherein said correcting for differences of perspective comprises determining a differential angle between points of the search volume, at least one of said points being an outer edge of the search volume, and modifying the differential angle as a function of range.

8. The method of claim 7, wherein the at least one of said points on the outer edge is located as a tangent point on a covariance ellipse.

9. The method of claim 6, further comprising determining in azimuth and elevation an angular extent of the search volume as corrected for said differences in perspective, associating a set of beam positions that correspond to the search volume as corrected, and operating the radar installation to apply said transmitted beams, wherein the subset of beam positions corresponds to projection of the search volume on to the acquisition face as corrected.

10. The method of claim 9, further comprising determining at least a far range extent of the search volume as corrected for said differences in perspective, and wherein the controller is operable to maintain said monitoring for reflected beams as necessary to detect reflected beams from the at least one search target up to the far range extent.

11. The method of claim 6, wherein said correcting for differences of perspective comprises the steps of:
   projecting a 3D covariance ellipsoid onto a range-traverse plane and onto a range-elevation plane to thereby produce two-D ellipses, one being on each of said range-traverse and range-elevation planes;
   determining maximum angular extents in said two ellipses in each of the range-transverse and range-elevation planes;
   determining ranges at which margins of said two ellipses occur and from said ranges and said two-D ellipses, determining subtended angles between the margins;
   increasing the subtended angles between the margins with decreasing range and decreasing the subtended angles with increasing range, thereby accounting for differences of perspective;
   deeming the increased and decreased subtended angles to be the angle representing the total extents in said transverse and elevation directions; and,
   controlling the radar to search within limits of angular extent corresponding to the increased and decreased subtended angles.

12. The method of claim 11, further comprising controlling the radar to search with limits of maximum and minimum range of the 2-D ellipses.

13. A computer implemented method for locating a radar search target, comprising:
   providing a radar installation with an array of adjacent beam positions diverging angularly from a radar transceiver coupled to a controller, the controller being operable for selectively activating transmitted beams and monitoring for reflected beams at least for a subset of the beam positions between limits of azimuth and elevation, the array of beam positions defining an acquisition face along one of a plane and a spherical surface, normal to a centerline of the radar installation and having an area increasing with range from the radar installation, wherein a time interval for activation of the beams defines a near and far range for the beams, between minimum and maximum limits of range;
   identifying in a processor at least one search volume to be examined for a presence of at least one search target;
   projecting in the processor the search volume onto the acquisition face and operating the controller for activating beam positions that correspond on the acquisition face to projected portions of the search volume;
   correcting in the processor for differences of perspective caused by certain portions of the search volume being closer to the radar installation than other portions of the search volume, wherein correcting for difference of perspective comprises:
- projecting a 3D covariance ellipsoid onto a range-traverse plane and onto a range-elevation plane to thereby produce two-D ellipses, one being on each of said range-traverse and range-elevation planes;
- determining maximum angular extents in said two ellipses in each of the range-transverse and range-elevation planes;
- determining ranges at which margins of said two ellipses occur and from said ranges and said two-D ellipses, determining subtended angles between the margins;
- increasing the subtended angles between the margins with decreasing range and decreasing the subtended angles with increasing range, thereby accounting for differences of perspective;
- deeming the increased and decreased subtended angles to be the angle representing the total extents in said transverse and elevation directions; and,
- controlling the radar to search within limits of angular extent corresponding to the increased and decreased subtended angles.

14. A non-transitory computer readable medium configured to store instructions which when executed by a processor cause the processor to perform the steps of:
- selectively activating transmitted beams and monitoring for reflected beams for at least a subset of beam positions between limits of azimuth and elevation provided by a radar installation having an array of adjacent beam positions diverging angularly from a radar transceiver, the array of beam positions defining an acquisition face along one of a plane and a spherical surface, normal to a centerline of the radar installation and having an area increasing with range from the radar installation, wherein a time interval for activation of the beams defines a near and far range for the beams, between minimum and maximum limits of range;
- identifying at least one search volume to be examined for a presence of at least one search target;
- projecting the search volume onto the acquisition face including correcting for differences of perspective caused by certain portions of the search volume being closer to the radar installation than other portions of the search volume;
- and activating beam positions that correspond on the acquisition face to projected portions of the search volume.

15. The non-transitory computer readable medium of claim 14, further comprising instructions that when executed by a processor cause the processor to perform the steps of:
- calculating a differential angle between points of the search volume, and relatively increasing and decreasing the differential angle between points as a function of a range that is nearer and farther from the radar installation, respectively.

16. The non-transitory computer readable medium of claim 14, further comprising instructions that when executed by a cause the processor to perform the steps of:
- projecting a 3D covariance ellipsoid onto a range-traverse plane and onto a range-elevation plane to thereby produce two-D ellipses, one being on each of said range-traverse and range-elevation planes;
- determining maximum angular extents in said two ellipses in each of the range-transverse and range-elevation planes;
- determining ranges at which margins of said two ellipses occur and from said ranges and said two-D ellipses, determining subtended angles between the margins;
- increasing the subtended angles between the margins with decreasing range and decreasing the subtended angles with increasing range, thereby accounting for differences of perspective;
- deeming the increased and decreased subtended angles to be the angle representing the total extents in said transverse and elevation directions; and,
- controlling the radar to search within limits of angular extent corresponding to the increased and decreased subtended angles.

* * * * *